July 19, 1955  F. W. LEUTHESSER, JR., ET AL  2,713,314
APPARATUS FOR BULGING HOLLOW METAL BLANKS
TO SHAPE IN A MOLD AND CONTROL
MECHANISM THEREFOR
Filed March 24, 1952  6 Sheets-Sheet 1

INVENTORS.
FRED W. LEUTHESSER, JR.
BY JOHN A. FOX
Zugelter & Zugelter
Attys.

July 19, 1955

F. W. LEUTHESSER, JR., ET AL 2,713,314

APPARATUS FOR BULGING HOLLOW METAL BLANKS
TO SHAPE IN A MOLD AND CONTROL
MECHANISM THEREFOR

Filed March 24, 1952

INVENTORS.
FRED W. LEUTHESSER, JR.
JOHN A. FOX
BY
Zugelter & Zugelter
Attys.

INVENTORS.
FRED W. LEUTHESSER, JR.
JOHN A. FOX
BY Zugelter & Zugelter
Attys.

July 19, 1955 F. W. LEUTHESSER, JR., ET AL 2,713,314
APPARATUS FOR BULGING HOLLOW METAL BLANKS
TO SHAPE IN A MOLD AND CONTROL
MECHANISM THEREFOR
Filed March 24, 1952 6 Sheets-Sheet 4
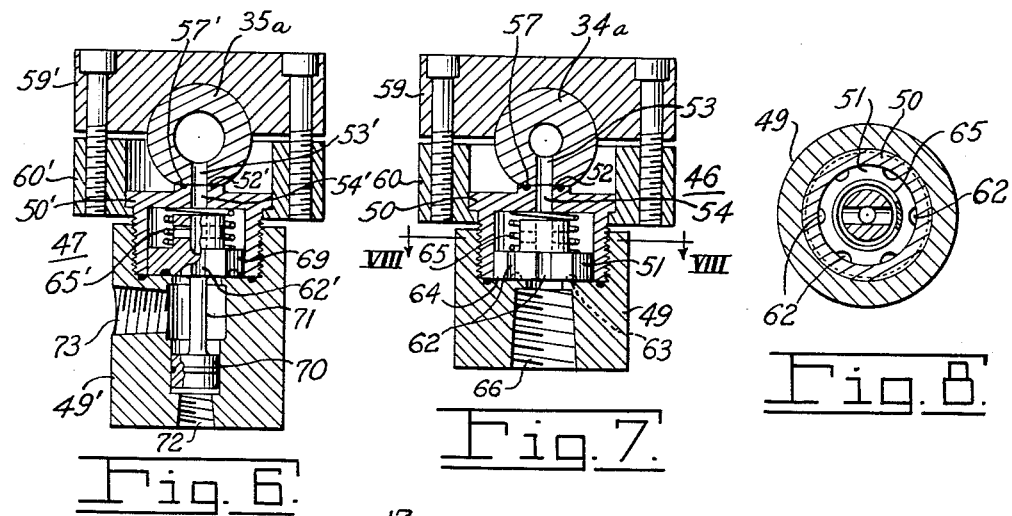
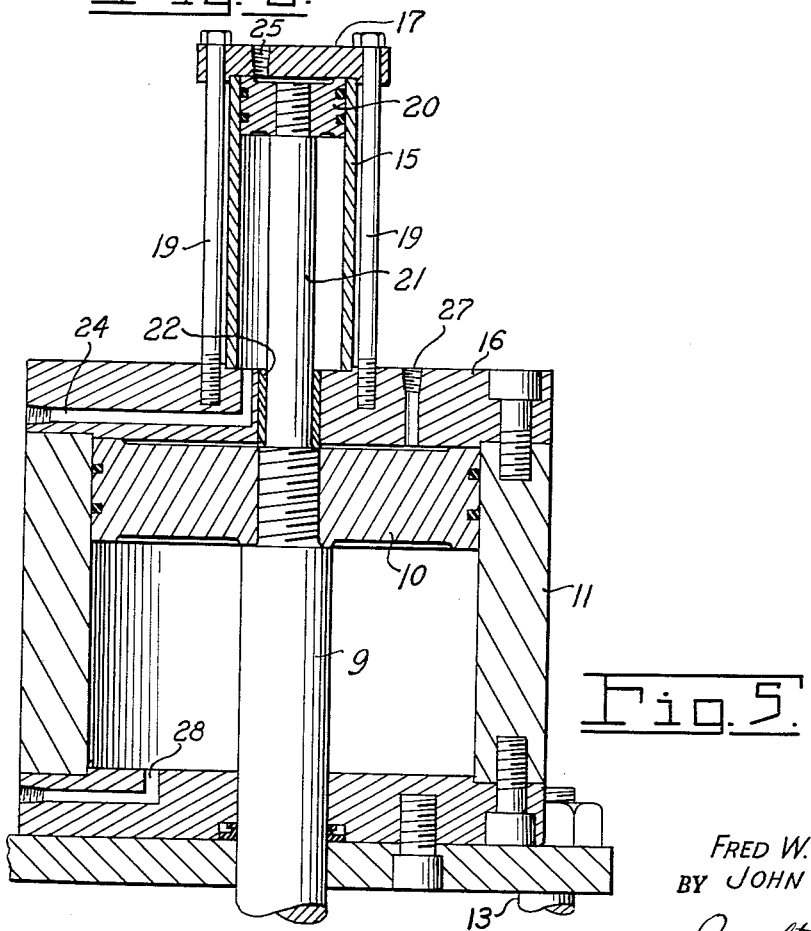
INVENTORS.
FRED W. LEUTHESSER, JR.
BY JOHN A FOX
Zugelter & Zugelter
Attys.

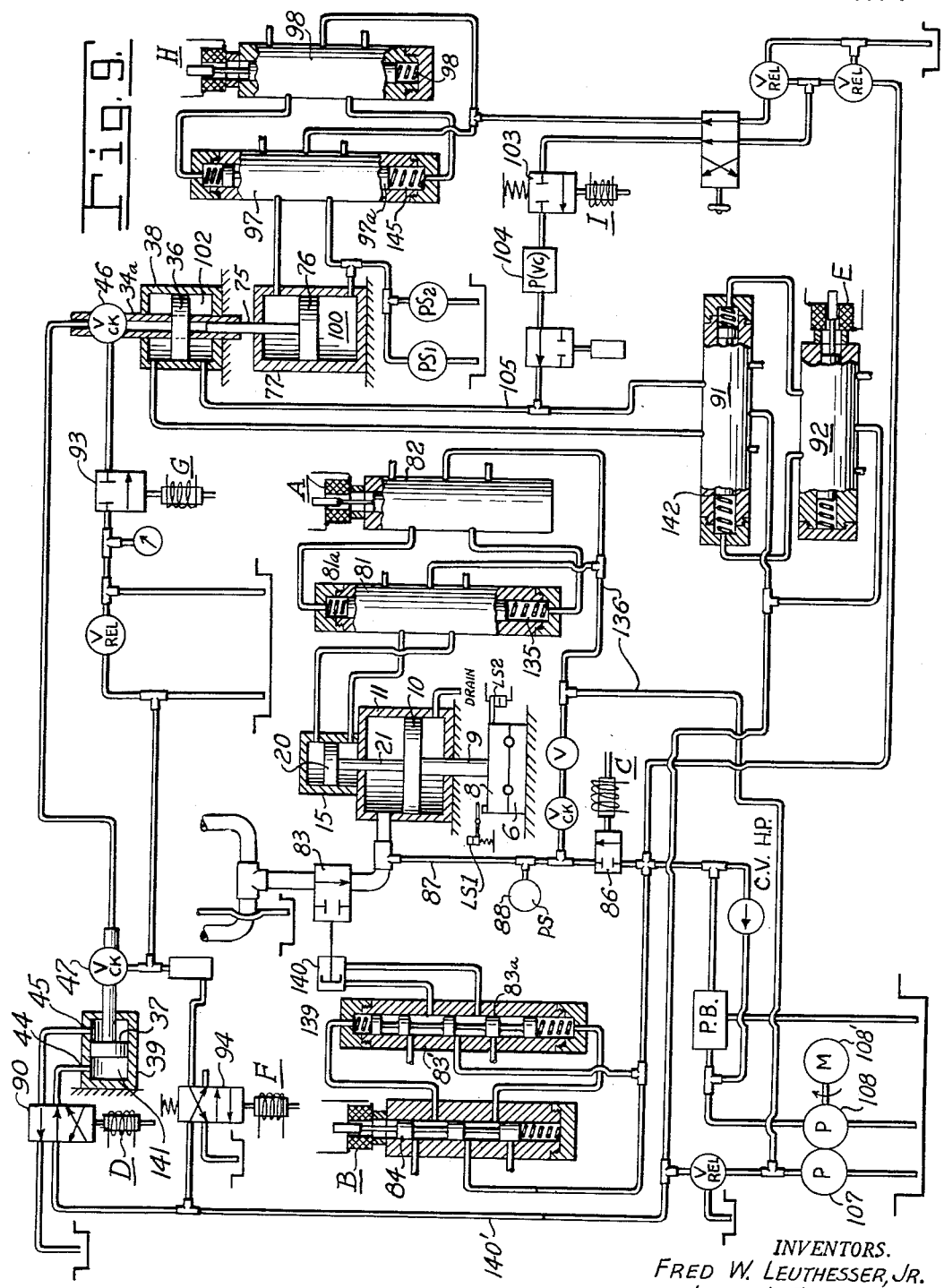

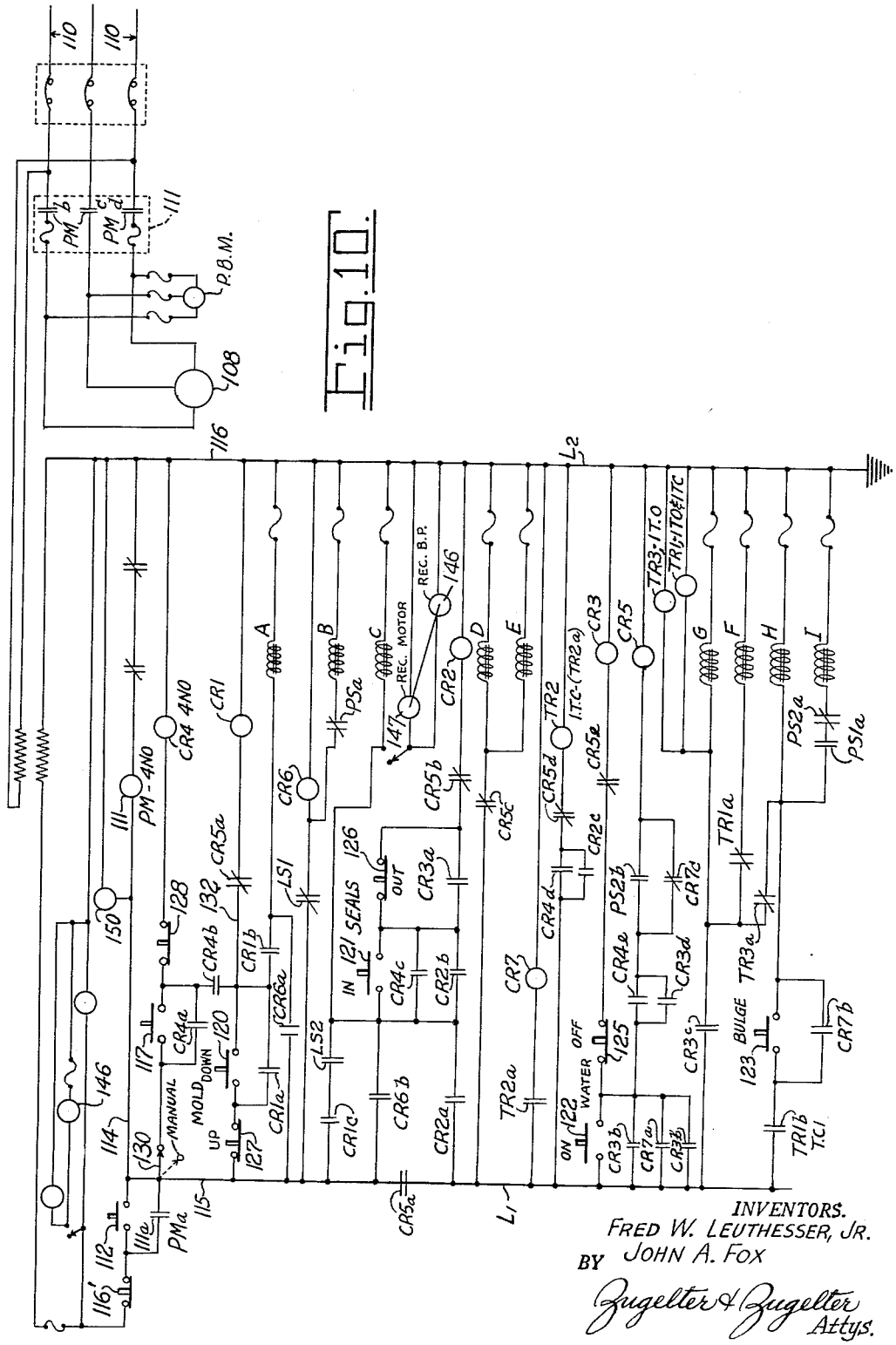

United States Patent Office 2,713,314
Patented July 19, 1955

2,713,314

APPARATUS FOR BULGING HOLLOW METAL BLANKS TO SHAPE IN A MOLD AND CONTROL MECHANISM THEREFOR

Fred W. Leuthesser, Jr., and John A. Fox, Cincinnati, Ohio, assignors to The Schaible Company, Cincinnati, Ohio, a corporation of Ohio Application March 24, 1952, Serial No. 278,238

17 Claims. (Cl. 113—44)

This invention relates to a machine for shaping a hollow metal tubular blank in a mold or die, the blank being bulged to the contour of the cavity of the mold by supplying increasing volumes of liquid under pressure to the interior of the blank or workpiece.

When shaping hollow starting blanks or workpieces in a mold cavity as above stated, an increase in internal volume of the workpiece results, with a consequent thinning of the wall of the workpiece at sections or locations where bulging is quite extensive. The thinning of the wall may be more pronounced in some parts of the blank than in others as some parts or sections may be bulged to a greater extent than other parts or sections. If the thinning of the wall becomes too pronounced the tubular workpiece is likely to rupture. To overcome excessive thinning of the wall of the workpiece, metal stock from either or both ends of the workpiece may be fed into the mold cavity thereby providing a supply of metal that can flow to the sections which would be stretched to the point of rupture, if the addition of metal stock were not thus supplied there.

More particularly the invention is applicable to the bulging to shape in a mold cavity, of a bent hollow tubular workpiece and the feeding of stock from either or both ends of the workpiece to the extent necessary to prevent rupture of the walls of the article while being so shaped. In the infeed operation the ends of the workpiece are undeformed.

The amount of liquid supplied to the interior of the tubular workpiece is proportional to the internal volume of the shaped article. The pressure required to force the bulging volumes of liquid into the workpiece is a function of the physical properties of the metal of the workpiece such as the yield point of the metal, its ductility, etc.

By properly correlating the bulging pressures, the volume of bulging liquid supplied to the interior of the blank and the rate of feeding-in of tubular stock from either or both ends of the workpiece, the blank may be bulged to the shape of the cavity in the mold without rupturing the wall of the blank even though the internal volume of the finished article has been increased to a value materially greater than the internal volume of the original workpiece.

The machine includes a press in which the stationary and movable parts of the mold or die are contained. Each part of the mold contains a complementary portion of the total cavity. The ends of the cavity are provided with runners that conform approximately to the shape and size of the undeformed workpiece and accommodate tubular seals that enter the ends of the blank. The bulging liquid is supplied through one of these seals and is bled through the other until the blank has been scavenged of air and completely filled with liquid.

After the workpiece has been completely filled with liquid it is trapped therein by check valves. The workpiece and the mold are then in the proper condition for the bulging and feeding-in operations.

When the mold of the machine is open, a bent tubular workpiece or blank is placed in the cavity of the stationary half and the upper or movable half is brought down on the lower half. That operation is accomplished by a power cylinder that opens and closes the mold. When the mold has been closed a power cylinder of greater capacity is energized to clamp the mold halves together. After the mold halves have been clamped, the tubular sealing members are driven by power cylinders into the ends of the workpiece to seal them. Liquid is then supplied to the blank through one sealing member, a portion being flushed or discharged through the other until air has been expelled and the workpiece has been filled. The workpiece is now ready to receive bulging pressures which are effected by supplying increasing volumes of liquid into the same. This liquid is supplied by a volumetric or displacement ram whereby predetermined volumes of liquid can be introduced into the workpiece at a controlled rate.

When it is necessary to infeed tubular stock from either or both ends of the workpiece lying in the runners in the mold, a force is applied by a power cylinder to the one or the other of the tubular seals or in some cases to both seals. That force is of a magnitude sufficient to move a given length of stock into the mold cavity. The infeed of stock and the bulging of the blank can take place simultaneously or alternately, and at rates relative to one another which will result in a finished piece that has been bulged to the shape of the mold cavity without rupturing the walls thereof. When the bulging operation has been completed, the tubular seals are withdrawn to relieve the internal pressure on the workpiece and the mold is opened thus completing a cycle, following which another blank may be placed in the machine and the cycle repeated.

An object of this invention is to provide a machine having a hydraulic power system for opening and closing a mold on a workpiece, sealing the ends of the workpiece and supplying increasing volumes of liquid to the interior thereof.

Another object of the invention is to provide a control system whereby the functions of a machine as set forth above may be effected automatically.

A further object of the invention is to provide a machine provided with a hydraulic mechanism for feeding predetermined lengths of undeformed portions of the workpiece into a mold cavity while the bulging of the workpiece to shape is in progress.

A still further object of the invention is to provide a control system whereby the infeed of tubular stock may be effected automatically and correlated with the rate of bulging of the workpiece.

Other objects of the invention are to provide novel hydraulic mechanisms for developing the infeed forces and bulging pressures required to expand a workpiece by internal pressure, to shape in a mold cavity.

Other objects of the invention will be apparent to those skilled in this art from the following description taken in conjunction with the accompanying drawings in which:

Fig. 5 is a view in section of the die positioning and clamping cylinders embodied in the machine shown in Figs. 1 and 4;

Figs. 6 and 7 are views in section taken on lines VI—VI and VII—VII of Fig. 3 showing the details of construction of check valves;

Fig. 8 is a view in section of the valve shown in Fig. 7 taken on line VIII—VIII thereof; and Figs. 9 and 10 are more or less diagrammatic views of the control system embodied in the invention for controlling the operations of the machine.

Figures 1, 2:
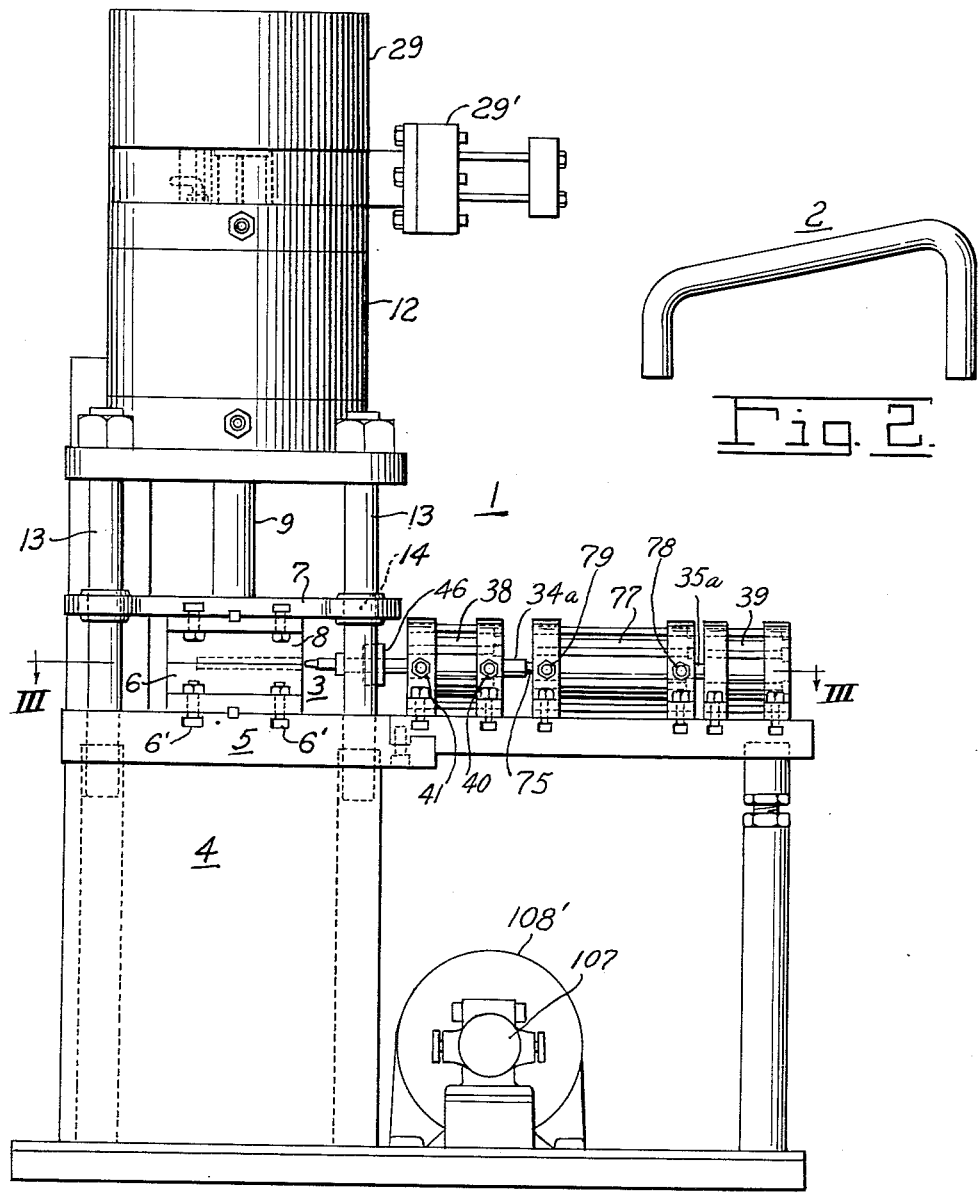
Figure 1 is a view in side elevation of a machine embodying the invention.
Fig. 2 is a view in side elevation of a bent tubular workpiece which is subsequently bulged to shape in the die of the machine shown in Fig. 1.

In Fig. 1 of the drawings a machine 1 is illustrated in which a hollow tubular metal blank or workpiece 2 is shaped to the contour of the cavity in a die or mold 3. The workpiece 2 is bulged to the form of the mold cavity by supplying increasing volumes of liquid to the interior of the workpiece at the pressures required to cause the metal to yield and stretch. The machine includes means for feeding predetermined lengths of the workpiece into the die cavity during the shaping thereof to supply metal stock in amounts sufficient to prevent excessive thinning and rupture of the walls of the workpiece.

The machine comprises a base 4 having thereon a heavy rigid stationary platen 5 on which the bottom half 6 of die 3 is mounted. The platen is provided with T-slots 6' by means of which the lower die half may be properly located and secured to the platen by means of bolts as shown. The machine also includes a heavy rigid movable platen 7 to the underside of which the upper half 8 of the mold is secured. The platen 7 is also provided with T-slots whereby the upper part 8 may be properly located with respect to part 6 and firmly secured to the platen by means of bolts as shown.

The upper die platen 7 is secured to the lower end of a vertical movable piston rod 9 whereby the upper mold part 8 may be positioned on the lower mold part to close the same or raised off the lower part to open mold position.

The piston rod 9 is connected to a piston 10 working in a cylinder 11 (see Fig. 5). The piston 10 and cylinder 11 are housed in a tank 12 and the entire assembly thereof is supported on columns 13 located at the corners of base 4. The upper platen 7 is provided with bushed holes 14 through which the respective columns pass, the columns thereby serving as guides for platen 7 as it is moved to or from closed position.

When platen 7 is in closed position, piston rod 9 applies a heavy clamping force to insure that the mold parts 6 and 8 will be firmly clamped together. Therefore the piston 10 and its piston rod 9 and cylinder 11 will be referred to as the mold clamping cylinder. As the power required to move platen 7 to or from closed position is not as great as that required to clamp the mold in closed position, a positioning cylinder 15 is provided and mounted on the head 16 of cylinder 11. Cylinder 15 is provided with a head 17 which is clamped to the upper end of the cylinder by bolts 19 threaded into cylinder head 16. Cylinder 15 has a piston 20 and a piston rod 21 connected thereto. As shown, rod 21 is a part of rod 9 so that pistons 10 and 20 move together. Rod 21 passes through a hole in cylinder head 16 in which a seal 22 is mounted as shown to seal the upper cylinder 15 from the lower cylinder 11. Cylinder 15 is provided with ports 24 and 25 at its opposite ends to which liquid at working pressure may be alternately applied to raise or lower the platen 7 from closed to open position or vice-versa.

Cylinder head 16 has a port 27 through which liquid at high pressure is applied to exert the force required to clamp the upper and lower mold parts 8 and 6 together when closed. The lower end of cylinder 11 has a port 28 through which liquid leaking past piston 10 may be drained.

Figure 4:
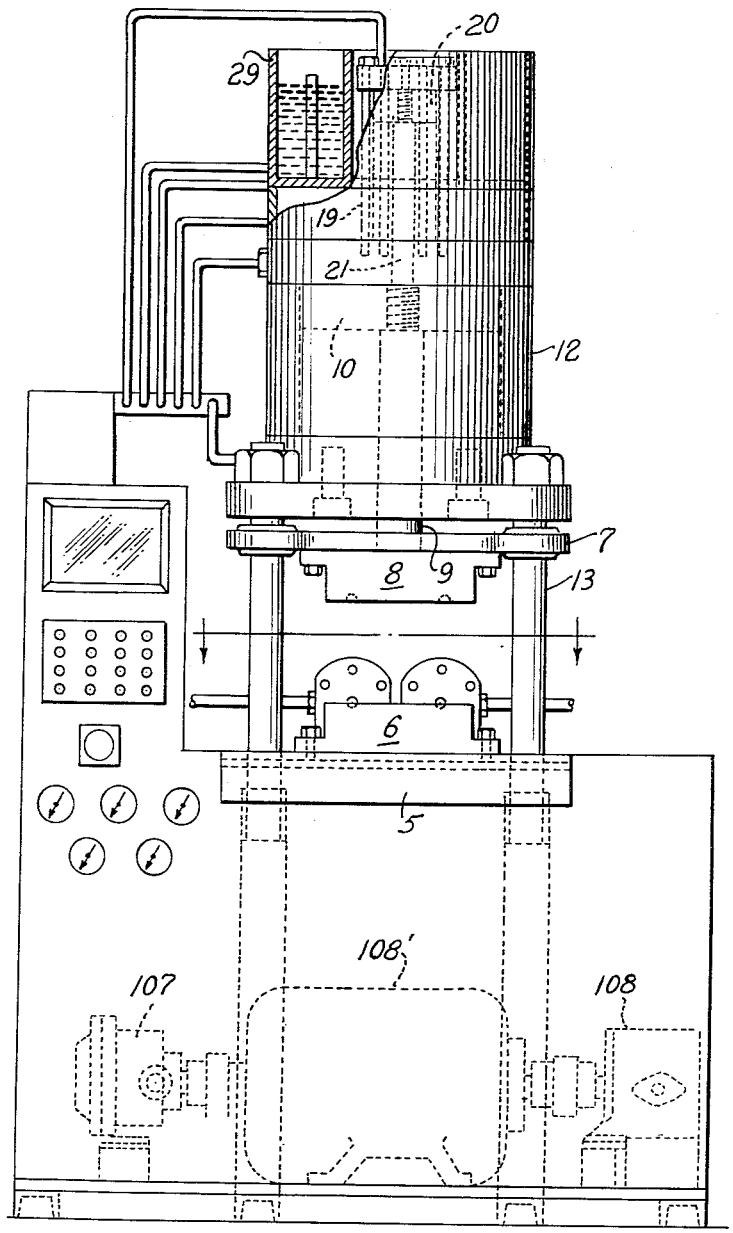
Fig. 4 is a view in front elevation of the machine shown in Fig. 1.

As shown in Figs. 1 and 4, the upper portion of cylinder 15 is housed in a tank 29 which contains a volume of liquid sufficient to fill the space in cylinder 11 above piston 10 as it is being moved downwardly by piston 20 to closed position. The liquid flows from tank 29 through a pre-fill valve 29'. When piston 10 has reached its mold closing position, valve 29' closes whereby only a comparatively small volume of liquid need be introduced through the port 27 at a pressure sufficient to clamp the mold parts 6 and 8 together. When the mold is moved to open position liquid under pressure is supplied through port 24 to the underside of piston 20. Just before the piston 20 starts on its upward movement, valve 29' is opened and port 27 is disconnected from the supply clamping liquid pressure, so that the liquid on the top of piston 10 can be discharged through port 27 through piping into tank 29.

Figure 3:
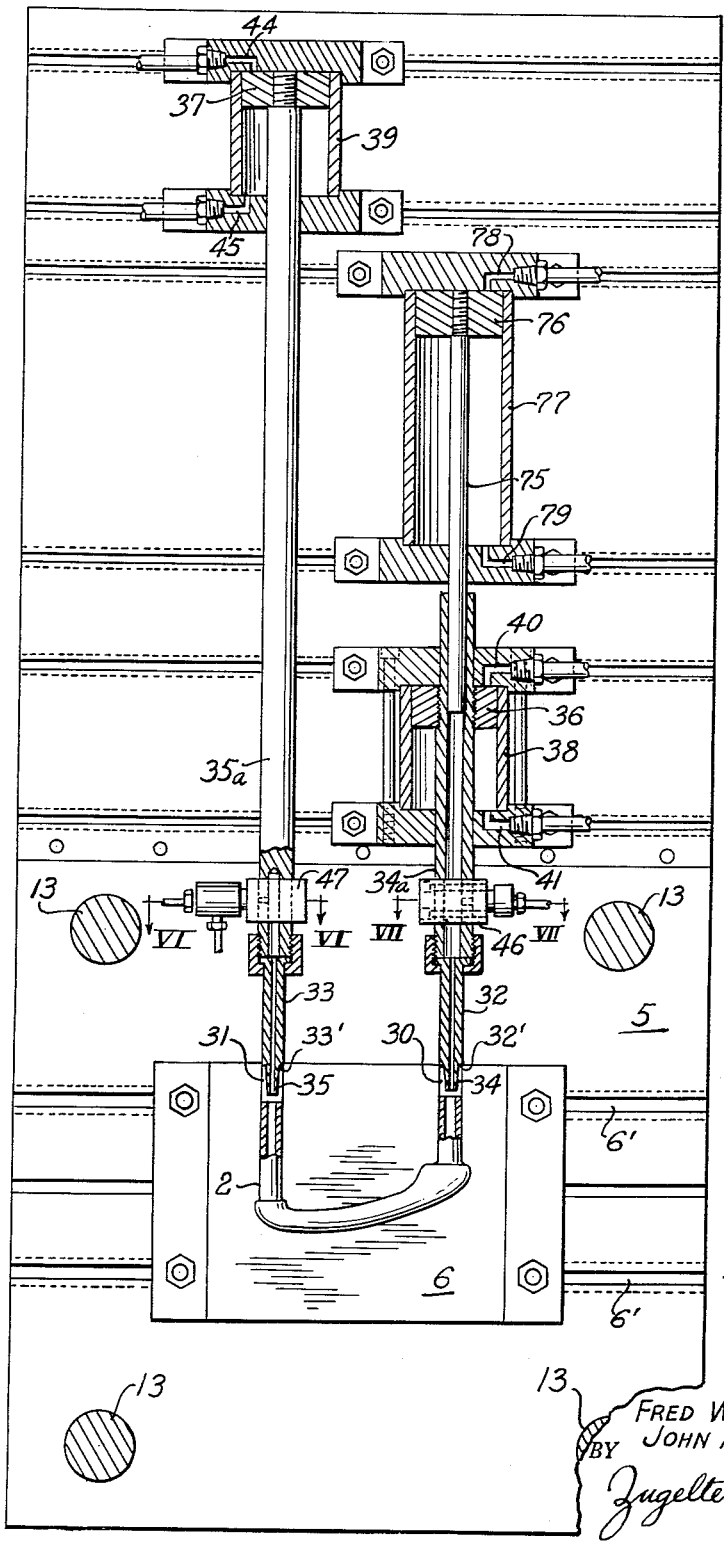
Fig. 3 is a view in section of the machine shown in Fig. 1 taken on line III—III thereof.

As shown in Fig. 3, the workpiece 2 is placed in the cavity of the lower mold part 6, it being understood that there is a similar cavity in the upper part 8. The mold halves are provided with tubular runners 30 and 31 that accommodate the end portions of the workpiece shown in Fig. 2. When the mold is closed and clamped the workpiece is ready for shaping.

The fluid for bulging the workpiece 2 to shape is supplied through tubular seals 32 and 33 having tapered ends 34 and 35, respectively, adapted to be received within the open ends of the workpiece. The seals 32 and 33 are provided with shoulders 32' and 33' which, when the seals are seated, abut the ends of the workpiece. Seals 32 and 33 are actuated into the runners 30 and 31 of the die by rams or rods 34a and 35a connected to pistons 36 and 37, respectively, working in cylinders 38 and 39.

Cylinder 38 is provided with ports 40 and 41 to which liquid under operating pressure is supplied. When liquid is supplied through port 40, piston 36 and its rod 34a are moved forwardly whereby the tapered end of seal 32 is seated in the open end of the workpiece located in runner 30. Fluid under pressure admitted to port 41 retracts seal 32 and removes its tapered end from the workpiece. Cylinder 39 is provided with ports 44 and 45 to which liquid under pressure may be admitted. When admitted to port 44 ram 35a and seal 33 are moved forwardly to seat the tapered end 35 of seal 33 in the open end of the tubular workpiece located in runner 31. Fluid admitted through port 45 retracts rod 35 and the tapered end of seal 33 from the workpiece. The control system embodied in the invention is preferably arranged to actuate pistons 36 and 37 simultaneously so that the open ends of the workpiece are sealed at the same time although they may be actuated in a sequence if desired.

To provide for scavenging the workpiece 2 of air and to insure complete filling of the same with liquid, valves 46 and 47 (see Figs. 6, 7, and 8) are mounted on rams 34a and 35a, respectively. Valve 46 comprises a body 49 having a bonnet 50 screwed into the same and a valve 51 within the body. The ram 34a has a flat surface 52 and a port 53 leading into the hollow of the ram. The bonnet 50 has a port 54 and a flat surface 55 containing a seal 57 which is seated on the flat surface on the ram. When the valve is clamped to the ram by clamp members 59 and 60 as shown in Fig. 7, ports 53 and 54 register.

Valve 51 is fluted at the sides thereof to provide flow passages 62, and with a seal ring 63 which seats on the seat 64 of the body. Valve 51 is urged towards closed position by a spring 65. The valve body 49 has an inlet port 66 which is connected by piping to a supply of liquid under pressure which in this system is provided by a motor-driven pump to be described infra.

Valve 47 is similar to valve 46, the similar parts being indicated by the same reference characters with primes affixed. Valve 69 in body 49' is seated by pressure applied to the interior of the workpiece but is unseated by a piston 70 which is connected by a strut 71 to valve 69 as shown. Pressure for actuating the piston is supplied through a port 72. When valve 69 is unseated liquid escapes through port 73 in body 49'.

When liquid is introduced into the hollows of ram 34a, tubular members 32 and 33, and the workpiece 2, the pressure of the liquid which fills these hollows is sufficient to unseat check valve 51. However, to unseat check valve 69 pressure is applied to the piston 70. When the workpiece has been scavenged and filled with liquid and the hollow of ram 34a has been filled in response to the scavenging stroke of piston 76 and ram 75, operating pressure to check valve 70 and the supply pressure to port 66 are cut off. The check valves then close and trap the liquid in the workpiece, ram 34a and the tubular seals 32 and 33.

Piston 36 not only seats the tubular seal 32 in the workpiece but also supplies the force required to feed predetermined lengths of the tubular stock lying in runner 30 into the mold cavity. For this purpose the pressure supplied at port 40 is built up by a pump to a value sufficient to effect the infeed of stock.

The pressure required to bulge that portion of the workpiece lying in the mold cavity is supplied by a ram 75 working in the hollow of ram 34a. It will be observed by inspection of Fig. 3 that the area of ram 75 is much less than the area of piston 76, therefore the pressure in pounds per square inch developed by the ram for bulging purposes will be much greater than the pressure supplied to piston 76 for the bulging stroke. Ram 75 is connected to a piston 76 working in a cylinder 77 disposed in line with cylinder 38. Cylinder 77 is provided with inlet ports 78 and 79 at its opposite ends through which liquid under pressure is supplied to accommodate ram 75 on its bulging stroke or to return it to its retracted position as shown in Fig. 3. When ram 75 is moved forwardly by piston 76 liquid in the hollow of ram 34a is forced by ram 75 into the workpiece 2 in the die cavity. The forward stroke of ram 75 and its piston 76 may be called the bulging stroke. The amount of travel of ram 75 inwardly of ram 34a determines the volume of liquid displaced into the workpiece and therefore the amount of bulging to which the workpiece is subjected in the mold cavity. The length of travel or the stroke of ram 75 and the rate at which it is advanced on its bulging stroke, will depend upon the physical characteristics of the metal of which the workpiece 2 is composed.

When a predetermined volume of liquid has been displaced into the workpiece, pressure is applied to port 40 of cylinder 38 whereupon a predetermined length of the workpiece lying in runner 30 is fed into the mold cavity to make up for loss of wall thickness in the metal of the workpiece within the cavity and to prevent rupture of the piece.

The physical properties of the metal of the workpiece may be such as to require bulging to a limited extent followed by infeed, followed again by bulging and infeed, or the physical properties may require that the workpiece be bulged only partially, after which it is removed from the mold and heat-treated. After heat treatment the workpiece is replaced in the mold subjected to further bulging and infeed operations. The volume of the mold cavity may be such that for a given metal the workpiece may require two or more stages of bulging and infeeding before it is finally forced against the walls of the cavity to its final form.

When the workpiece has been bulged to its final shape or to the limit of a given stage of bulging, the rams 34a and 35a are retracted whereby the liquid in the workpiece escapes and drains to a sump where it is returned to tank 12. The internal pressure on the workpiece having been thus relieved, the die is opened in the manner above described and the workpiece removed. If, as stated above, the workpiece has not been bulged to its final form, it is heat-treated and replaced in the die following which the above-described procedure is repeated.

The cycle of the machine for a given bulging and feeding operation may be summarized as follows: With the mold in open position the workpiece is placed in the cavity in the lower mold part 6 as shown in Fig. 3 and the mold closed and clamped by means of pistons 20 and 10. The seals 32 and 33 are then moved forwardly into the ends of the workpiece lying in runners 30 and 31 by means of pistons 36 and 37. After the seals have been seated liquid is supplied to the hollow of ram 34a and the workpiece by supplying liquid through check valve 46 while check valve 47 is open. When the air has been scavenged and the workpiece and the bulging ram chamber have been completely filled with liquid, check valve 47 is closed and the supply of liquid to check valve 46 is cut off, thereby trapping liquid in the parts thus described. The bulging operation is then initiated by supplying working liquid pressure to piston 76 which forces ram 75 forwardly through the hollow of ram 34a thereby displacing bulging liquid into the workpiece 2. When the bulging pressure reaches a predetermined value the control system functions to effect infeed of stock from runner 30 into the die cavity by supplying the required working pressure through port 40 to piston 36. If the bulging and infeed is sufficient in one stage to shape the workpiece to the shape of the die cavity, that is, against the walls of the die cavity, the tubular seals 32 and 33 are retracted to allow liquid in the workpiece to be discharged following which the die is opened and the workpiece is removed. If the workpiece requires more than one stage of bulging and infeed in order to finally shape it against the walls of the die cavity, the above cycle is repeated, the workpiece being suitably heat-treated between successive stages of bulging and infeed.

The above described cycle is effected by means of a control system such as shown in Figs. 9 and 10 and described in the following.

The control system provided for operating the die positioning and clamping power cylinders 15 and 11, the seal actuating cylinders 38 and 39, the mechanism for pre-filling of the workpiece or blank with liquid when in the die, and the die is closed, the bulging cylinder 77 and the infeed of stock by means of either or both of the seal actuating cylinders 38 and 39, the withdrawal of the seals by those cylinders and the opening of the die may best be understood with reference to Figs. 9 and 10.

Fig. 9 shows more or less diagrammatically the die positioning cylinder 15 which is utilized to position the die in open or closed positions, the die clamping cylinder 11, the seal actuating cylinders 38 and 39 and the bulging cylinder 77, in such arrangement as to facilitate the description of the control system and its functions. As shown, seal cylinder 38 is utilized also as the stock infeed cylinder, that is, it feeds a portion of the tubular workpiece or blank located in the die runner 30 into the die cavity for purposes explained supra.

The mold positioning cylinder 15 is controlled by a pressure actuated valve 81, which is governed by a pilot valve 82 operated by a solenoid A.

The clamping cylinder 11 is filled with liquid from tank 29 as the positioning cylinder 15 moves mold part 8 to closed position. The flow of liquid for pre-filling the space above the pressure face of piston 10 in cylinder 11 is controlled by a valve 83 governed by a pilot valve 84 which in turn is actuated by solenoid B.

Fluid at high pressure is delivered to clamping cylinder 11 when mold part 8 is closed on its complementary mold part 6. When the mold is closed a valve 86 is actuated by a solenoid C whereby high pressure liquid is supplied to the clamping face of piston 10, the high pressure fluid being supplied by a suitable pump. When the pressure in the line 87 leading to the space above piston 10 reaches a predetermined value, a pressure switch 88 opens to de-energize solenoid B, whereupon the pre-fill valve 83 is closed.

When the mold part 8 is seated on mold part 6 fluid under pressure is admitted to the seal cylinders 38 and 39, the fluid so admitted being controlled by valves 90 and 91, respectively. Valve 90 is actuated by a solenoid D while valve 91 is controlled by a pilot valve 92 actuated by solenoid E.

When the hollow seal members 32 and 33 have been actuated into the die runners 30 and 31 and into the tubular portions of the workpiece lying in the die, as shown in Fig. 3, fluid is introduced into the workpiece through check valve 46 and is caused to discharge through check valve 47. Liquid is supplied through check valve 46 by means of a valve 93 actuated by a solenoid G. Check valve 47, as shown in Fig. 6, is actuated to open position by piston 70. Operating pressure for opening check valve 47 is supplied through a valve 94 actuated by solenoid F.

While fluid is being circulated through the workpiece and the bore in the bulging cylinder, piston 76 is in its retracted position, that is, at the initial point of its bulging stroke. While the fluid is being supplied to the workpiece as above described, the control system functions to cause piston 76 to move forward and force liquid under pressure through the workpiece to secure complete scravenging of air that may be trapped in the workpiece and the seals. Piston 76 moves forward under the application of fluid pressure admitted by a pressure actuated valve 97 which in turn is controlled by a pilot valve 98 that is operated by a solenoid H. When solenoid H is energized, motive fluid is admitted to space 100 forcing piston 76 forwardly on its bulging stock. When solenoid H is de-energized, fluid is admitted to the opposite side of the piston, causing it to return to its initial position.

When the bulging piston 76 has returned to its initial position, solenoid F is de-energized and fluid or liquid is trapped in the workpiece, check valves 46 and 47 being closed at that time. The control system them functions after the lapse of a timed period to re-energize solenoid H whereby piston 76 is moved forwardly to displace liquid into the workpiece in the die thereby to enlarge the same and cause it to approach the shape of the die cavity. When the bulging pressure in the space 100 behind piston 76 reaches a predetermined value, pressure-responsive controls function to discontinue further application of the bulging pressure and to cause high pressure to be admitted to space 102 behind piston 36. Piston 36 moves forwardly to force undeformed tubular stock in runner 30 into the die cavity to thereby furnish a supply of metal stock which is distributed to the portion being enlarged and prevents rupturing and undue thinning of the wall of the bulged portion of the blank.

The infeed pressure is supplied through a valve 103 actuated by a solenoid I. Solenoid I is energized at a time when solenoid E is de-energized and valve 91 is in closed position. The high pressure liquid supplied through valve 103 flows through a volume rate regulator 104 into line 105 which is connected to space 102 of the cylinder. Regulator 104 controls the rate of infeed of stock by piston 36. The pressure supplied to space 102 results in the feeding of underformed stock into the die cavity until the pressure in line 105 is built up to a predetermined value at which time solenoid I is de-energized. Upon de-energization of solenoid I the control system functions to cause the pistons 36 and 37 in the seal actuating cylinders 38 and 39 to withdraw the seals from the open ends of the workpiece in the die and from the die runners, thereby releasing the internal pressure on the workpiece. The control system then proceeds to open the dies. The dies are opened in response to de-energization of solenoid A. When that occurs, valve 81 is actuated to supply pressure to the underside of piston 20 whereby the pistons 20 and 10 are raised. As soon as pistons 10 and 20 are about to move on their die opening stroke, valve 83 is opened so that the fluid in the space above piston 10 may return to tank 29.

In Fig. 10, the electrical circuits for effecting the control functions above described are illustrated in straight line form. In that system two pumps 107 and 108 (see Fig. 9) are employed for developing the necessary hydraulic pressures, pump 107 supplying low pressure fluid and pump 108 high pressure fluid. Pumps 107 and 108 are driven by a motor 108'. Motor 108' may be connected to or disconnected from the power supply source 110 by means of a starter 111. Starter 111 includes four normally open contact members 111a, 111b, 111c, and 111d. Contact member 111a serves as a holding circuit contact member for the starter solenoid while contact members 111b, 111c and 111d are the main contact members for motor 108'. To energize and close the motor starter 111, a normally open "start" push button switch 112 is closed whereby the circuit for the starter is established through conductor 114, and connected to the power supply lines 115 and 116. Upon the closing of the starter 111, contact 111a thereof bridges the starter push button switch 112, whereby, upon its release, a holding circuit for the motor starter is maintained. To stop the motor it is only necessary to open a normally closed "stop" push button switch 116'.

In the control system there is included a normally open "cycle" push button switch 117 which starts the cycle of closing the dies, assuming the dies are open, actuating the seals into position, the filling of the workpiece in the die, and then, following bulging and feeding operations above described, the withdrawal of the seals from the workpiece in the die and finally, the opening of the die.

The functions above described may be performed automatically or by hand. In order that these functions may be performed by hand the control system includes a normally open "mold down" push button switch 120 by means of which die part 8 is moved down on die part 6, and a "seals in" push button switch 121 by means of which actuation of the seals into position is effected, and a "water on" push button switch 122, which, when closed, causes the liquid to be introduced into the workpiece as above described, and a "bulge" push button switch 123 which, when closed, causes the bulging cylinder 77 to function. An "infeed" push button switch is not illustrated as the infeed is accomplished in conjunction with the bulging control.

In order that the seals may be withdrawn from the workpiece and the die half 8 raised to open mold position, there is provided in the water control portion of the circuit a normally closed "water off" push button switch 125, which, when opened, shuts off the supply of water or liquid to the workpiece. A normally closed "seals out" push button switch 126 in the seal control circuit is provided for effecting withdrawal of the seals and lastly, there is provided a normally closed "mold up" push button switch 127 which, when opened, causes the die to move to open position. When the die has reached open position, it is caused to remain in that position by the opening of a normally closed push button switch 128 which, when opened, stops the cycle.

In order to transfer the control system from manual to automatic, or vice-versa, a switch 130 is provided. When it is in the position shown, the system is on automatic, and when in the dotted line position, it is on manual control.

Assuming that the mold or die is in open position and that a workpiece is in the die cavity of the lower die half 6 as shown in Fig. 3, and it is desired to perform the bulging operations on the workpiece, and assuming that the pump motor 108' is operating, the cycle push button switch 117 is depressed and closed, whereupon a control relay CR4 is energized. Control relay CR4 is provided with a plurality of normally open contact members CR4a (contact member CR4a bridges the push button switch 117 and maintains the energizing circuit for the control relay CR4), CR4b, CR4c, and CR4d. Contact member CR4b connects the junction point between switches 117 and 128 to a conductor 132 whereby a control relay CR1 in the circuit of that conductor, is energized. The circuit for control relay CR1 is established through contacts CR4a and CR4b and normally closed contact CR5a. Contact CR5a is normally closed and is opened when control relay CR5 is energized.

Control relay CR5 is provided with normally closed contact members CR5a to CR5e inclusive, located in series circuit with control relays CR1, CR2 and CR3 and solenoids D and E and a timing relay TR2, the functions of which will appear infra. Control relay CR5 also includes normally open contact members f and g, the functions of which will appear infra.

Upon the closing of relay CR4, the relay CR1 is energized through contacts CR4b of relay CR4. When relay CR1 is energized, normally open contact members CR1a and CR1d thereof are closed. Contact CR1a establishes a holding circuit for the "mold-down" button 120, while contact CR1b establishes the energizing circuit for solenoid A. When solenoid A is energized it actuates pilot valve 82. Valve 82 supplies pressure to cylinder 135 of valve 81, whereby the pressure acting on one end of valve 81a is shifted to that position in which fluid pressure from the low pressure line 136 is delivered to the top of piston 20 in cylinder 15 causing piston 20 to move downwardly. As soon as piston 20 has moved a slight distance, a limit switch LS1 connected to the mold or die part 8 is closed, whereby pre-fill valve solenoid B and control relay CR6 are energized and its contacts CR6a and CR6b are closed. Contact CR6b bridges contact members CR1a and CR1b of relay CR1. Contact CR6a bridges contact member CR1e of relay CR1 and a limit switch LS2 which are series connected. Limit switch LS2 is closed when die part 8 is seated on die part 6 and the mold or die is closed. Upon the closing of switch LS2 solenoid C is energized.

Solenoid B when energized, actuates its pilot valve 84 to a position in which pressure is supplied to a cylinder 139 of valve 83' which acts on one end of valve 83a causing it to be actuated to the position in which pressure is supplied to actuator 140 of pre-fill valve 83 causing it to open and admit fluid from tank 29 to the space above piston 10. Thus, as piston 10 moves toward the closed die position the space above the piston is being filled. In response to the energization of solenoid C it opens valve 86 and admits fluid pressure into line 87 whereby high pressure is supplied to the liquid above piston 10 to clamp the mold in closed position. As soon as the pressure delivered by line 87 reaches a predetermined value, normally closed contacts PSa of pressure switch PS are opened and solenoid B is de-energized whereby pre-fill valve 83 is closed.

Contact member CR4c of relay CR4 when closed bridges the "seals in" push button switch 121, and contact member CR4d of relay CR4 when closed energizes a timing relay TR2 through normally closed contact member CR5d. Timing relay TR2 is arranged to close contact member TR2a in circuit with a control relay CR7 when a predetermined time interval has elapsed. Upon the energization of relay CR7 which follows the passage of the time interval, contact member CR7a closes, whereby relay CR3 is energized through contact members CR7a, push button switch 125 and normally closed contact member CR5e.

In response to the energization and closing of relay CR3 its contact members CR3a and CR3b are closed whereupon control relay CR2 is energized in a circuit that includes closed contact member CR6b, contact members CR4c, contact members CR3a and normally closed contact members CR5d. When relay CR2 is energized, its contact members CR2a and CR2b are closed whereby solenoids D and E are energized through contact members CR6b and CR2a and normally closed contact member CR5c. When solenoids D and E are energized, valves 90 and 92 are actuated.

Valve 90 admits pressure from low pressure line 140' to space 141 in cylinder 39 causing seal 33 to move forwardly into the die runner 31 and into the end of the workpiece or blank located in that runner. Valve 92 applies pressure to actuator 142 of valve 91 causing pressure to be supplied to space 102 in cylinder 38 whereby seal 32 is moved into die runner 30 and into the end of the workpiece of the blank lying in that runner. The workpiece in the die is now in condition to receive liquid for bulging the same to shape.

When relay CR3 is energized, its contact members CR3a and CR3b being closed, energizing circuits for timing relays TR1 and TR3 are established. Relay TR1 is provided with a set of normally closed contacts TR1a which are timed to open after the elapse of a predetermined length of time and another set of contacts TR1b which are normally open but which are timed to close at the end of that predetermined length of time. Timing relay TR3 is provided with a set of normally closed contacts TR3a which are timed to open after a predetermined length of time.

When relay TR1 is energized, solenoid F is energized through contact member CR3c of control relay CR3 and the normally closed contacts TR1a of relay TR1. Upon the energization of solenoid F it opens valve 94 whereby pressure is applied to piston 70 of check valve 47 and that valve is opened. Also, upon the closing of contact members CR3c, solenoid G is energized whereby valve 93 is opened admitting fluid pressure through check valve 46 into the ram chamber of ram or piston 34 and the workpiece in the die. Thus bulging liquid is caused to flow through and fill the workpiece. Since the normally closed contacts TR3a of timing relay TR3 have not yet opened, solenoid H is energized and valve 98 is actuated to admit pressure to cylinder 145 of valve 97 which acts on the end of valve 97a and shifts it to the position in which pressure is supplied to the space 100 of cylinder 77. Piston 76 therefore moves forwardly and forces liquid under pressure through the workpiece in the die or mold. As soon as the time delay of relay TR3 has run its course, its normally closed contacts TR3a are opened whereby solenoid H is de-energized. When solenoid H is de-energized the pilot valve is returned by a spring 98' whereby fluid pressure is supplied to cylinder 145 whereby valve 97a is returned to the position in which fluid pressure is applied to the return face of bulging piston 76, thereby causing the bulging piston to return to its initial position. Also, when the normally closed contacts TR1a of relay TR1 have opened, after a predetermined length of time, solenoid F is de-energized and check valve 47 is released to its closed position. At this time both check valves 46 and 47 which are biased to seat in closed position in response to the pressure applied to them, will be closed.

When the time interval of timing relay TR1 has run its course, the set of normally open contacts TR1b will close, whereupon solenoid H is re-energized through a circuit including contact members TR1b, contact members CR7b and solenoid H. Upon the re-energization of solenoid H valve 98 is again actuated to a position where operating pressure is supplied to cylinder 145 whereby valve 97a is shifted to admit high pressure fluid to space 100 of the bulging cylinder. The bulging piston 76 will then move forward to displace fluid into the workpiece in mold 3. The pressure will continue to build up in space 100 until the workpiece yields. As the pressure rises, a pressure actuated switch PS1 connected to the inlet pipe leading to space 100 closes when a predetermined pressure is reached. Upon the closing of the pressure switch PS1 solenoid I is energized and opens valve 103 causing fluid under high pressure to be delivered to pipe 105 which leads to space 102 of cylinder 38. Piston 36 will then move forward and feed undeformed stock of the workpiece lying in runner 30 into the mold cavity, the purpose of which is to supply metal to that portion of the workpiece which is being enlarged so that the walls thereof will not thin down to the point where rupture might occur. Meanwhile the bulging pressure in space 100 is acting on the fluid in the workpiece and as that pressure rises to a predetermined high value, a pressure switch PS2 is actuated. Switch PS2 is provided with a set of normally closed contact members PS2a in series with the contacts of pressure switch PS1 and solenoid I, causing the normally closed contacts to open, whereby solenoid I is de-energized.

Pressure switch PS2 is also provided with a set of normally open contacts PS2b in series with a control relay CR5. Upon the closing of the normally open contact members PS2b which are in parallel circuit with normally closed contact members CR7c which are now open, relay CR5 is energized and its contact members CR5f are closed and its normally closed contact members CR5a to CR5e are opened. When this occurs, relays CR1, CR2, solenoids D and E, and control relay CR3 are de-energized, and the seal actuating cylinders are operated to retract the seals 32 and 33 from the ends of the workpiece in the die and the runners in the die, thereby relieving the workpiece of pressure, after which the mold positioning solenoid A is de-energized. When solenoid A is energized the high pressure for clamping the mold is reduced to the point where pressure switch contacts PSa are closed.

When the mold positioning relay A has been de-energized, valve 81 is actuated by means of pilot valve 82 to that position in which fluid pressure is applied to the underside of piston 20, whereupon the mold part 8 is raised to its open position. When it reaches its open position, limit switch LS1 is opened, whereupon control relay CR6 is de-energized. Upon such mold open position, push button switch 128 is opened manually whereby the cycle control is interrupted and the mold brought to rest so that the finished workpiece may be moved from the die and another workpiece or blank inserted. The automatic cycle is again initiated by closing switch 117 and then closing the "mold down" push button switch 120.

In Fig. 10 certain auxiliaries are shown that may be used or not at the option of the operator. For example, there are indicated a light 150 which goes on when the pump starter 111 is energized, and a recorder 146 for indicating the bulging pressure applied to piston 76. The recorder 146 may be driven by a motor 147 which is energized upon the closing of control relay CR6.

The control system shown in Fig. 10 may be operated entirely by manual manipulation by placing switch 130 in manual position. When in that position, the "mold down" switch 120 is closed whereby control relay CR1 is energized. Next, the "seals in" button 121 is closed. When the seals have been seated, the "water on" switch 122 is closed, following which, the bulge switch 123 is closed. Since the control relay CR4 does not function on manual control, control relay CR2 is provided with normally open contacts CR2c which bridge contact member CR4d whereby the timing relay TR2 may be energized at the proper time. Likewise, the control relay CR3 is provided with a set of normally open contacts CR3d which bridge contact members CR4e of control relay CR4. Contact members CR3d make it possible for the relay CR5 to be energized when the contacts of high pressure switch PS2 are closed during the bulging of the workpiece in the die.

To shut off the water supply under manual control, the push button switch 125 is depressed and opened, and to bring the seals 32 and 33 out of the workpiece in the die, the "seals out" push button switch 126 is depressed. After the seals have been retracted, the "mold up" push button switch 127 is depressed, whereby the upper die half 8 is raised to its open position.

Having thus described the invention, it will be apparent to those skilled in this art, that various modifications and changes may be made without departing from either the spirit or scope of the invention.

Therefore, what is claimed as new and desired to be secured by Letters Patent is:

1. A mechanism for bulging hollow metal blanks to shape in a mold cavity by supplying increasing volumes of liquid to the interior of the blank, comprising a mold having a cavity therein and comprising relatively stationary and movable parts, tubular runners in said mold parts disposed to receive the ends of a blank when placed in said mold cavity, means for moving one of said movable mold parts to or from the other mold part, means for holding said movable mold part against the other when the mold is closed, hollow seal members having tapered ends spaced to align with said mold runners, means for actuating the tapered ends of said seals in the respective ends of a hollow blank in said mold, means for supplying liquid into said blank through one of said seals and discharging the liquid through the other seal to scavenge air from the blank and seals, timing means for shutting off said discharge when liquid has flowed a predetermined length of time through said blank, means for displacing volumes of said liquid into the hollow blank with a bulging force sufficient to cause the portion of said blank within the mold cavity to yield and be enlarged, and means responsive to a predetermined bulging pressure in said liquid for arresting the operation of said liquid displacement means.

2. Mechanism according to claim 1, characterized by the fact that means responsive to the development of a predetermined low value of bulging pressure are provided for applying a force to one of said tubular seals of sufficient magnitude to feed a portion of the hollow blank in one of said runners into said mold cavity.

3. Mechanism according to claim 1, characterized by the fact that means responsive to the development of a predetermined low value of bulging pressure are provided for applying a force to one of said tubular seals sufficient to feed a portion of the hollow blank lying in one of said runners into said mold cavity, and that timing means responsive to a predetermined high value of bulging pressure are provided for interrupting the operation of said feeding means when said bulging pressure has persisted for a predetermined length of time.

4. Mechanism according to claim 1, characterized by the fact that means are provided for applying a force to one of said tubular seals sufficient to feed a portion of the hollow blank in one of said runners into said die cavity, in response to the development of a bulging pressure of a predetermined value, that timing means are provided for interrupting the operation of the feeding means a predetermined length of time after said feeding force reaches a predetermined value, and that means responsive to the operation of said timing means to interrupt operation of said feeding means are provided for removing the said tubular seals from the runners in said mold when operation of the feeding means has been interrupted.

5. A bulging mechanism comprising a mold having a stationary part and a movable part, said parts having cavities therein which when the mold is closed form a cavity corresponding to the shape to which a hollow blank is to be shaped and runners leading to the cavity, an hydraulic cylinder having a piston connected to the movable mold part for moving the same to or from closed position, a second hydraulic cylinder having its piston connected to said movable mold part, means for applying hydraulic pressure to said second piston of such a value as to clamp the mold parts in closed position, hollow tubular seals having tapered ends positioned to be moved into the runners of said mold when closed and into the ends of a hollow blank therein, an hydraulic cylinder for actuating each of said seals, each cylinder having a piston and a ram coupled to its respective seal, one of said rams being hollow, means for supplying liquid into one of said rams for filling said ram and said hollow blank, the other ram having means for effecting the flow of liquid through said ram and hollow blank to scavenge air therefrom and fill the blank, an ahydraulic bulging cylinder having a piston therein and a bulging ram coupled thereto, said bulging ram working in said hollow ram and being disposed to displace liquid into the hollow blank in the mold, one of said hydraulic seal actuating cylinders being provided with means for causing the same to force a predetermined length of an end portion of the hollow blank in said runner into the mold cavity.

6. Mechanism according to claim 5, characterized by the fact that one of said hollow seals is connected to a check valve which is held in closed position by the pressure applied to the liquid in the hollow blank, said check valve being provided with means for opening the same.

7. Control mechanism for actuating the hydraulic cylinders of claim 5 comprising a solenoid actuated pilot valve for applying liquid pressure to the mold positioning cylinder to close the mold, said valve being normally biased to admit fluid to said positioning cylinder to return it to open mold position, a solenoid actuated pilot valve for applying hydraulic fluid to the clamping cylinder when the die is in closed position, solenoid actuated pilot valves for causing fluid pressure to be applied to the tubular seal actuating cylinders, said valves being biased to actuate said seal actuating cylinders to retracted position, means controlled by the mold parts for actuating the pilot valves of the seal actuating cylinders to open position when the movable mold reaches closed position and causing the seals to seat in the ends of the blank, means for supplying liquid to said hollow ram and to the hollow blank in the mold, a check valve connected to one of said seals, means responsive to the seating of said tubular seals for actuating said liquid supply means and opening said check valve to bleed liquid and air from the hollow blank, a solenoid actuated pilot valve for causing the bulging ram piston to move, when the solenoid is energized, in a direction to displace a predetermined quantity of liquid through the hollow blank, timing means for energizing said solenoid of the valve controlling the bulging piston and de-energizing the same when a pre-set time interval has elapsed, means for biasing the pilot valve controlling the bulging ram in a direction to cause the bulging ram to return to its initial position when the solenoid is de-energized, means for closing said bleed check valve, means for applying operating fluid pressure to the bulging ram cylinder to displace liquid into the hollow blank to bulge the same, a solenoid operated pilot valve for supplying liquid pressure to one of the cylinders whose piston is connected to one of said tubular seals and means responsive to a predetermined value of bulging fluid pressure for arresting movement of the bulging piston and causing the pilot valve to actuate the feed piston in a direction to feed a portion of the hollow blank in said runner into the die cavity.

8. A control system according to claim 7, characterized by the fact that electrical interlocks between the solenoid of the pilot valve for the clamping cylinder and the solenoids for the pilot valves for the tubular sealing members are provided which prevent de-energization of the clamping cylinder valve solenoid until the power cylinders for said sealing members having been retracted from the ends of the blank in said mold.

9. Apparatus for bulging a tubular blank to the shape of a cavity in a split mold having relatively movable mold members, comprising a hydraulic power cylinder mechanism for opening and closing the mold, said split mold members having runners providing access to the open ends of a hollow workpiece in the mold, tubular seals having tapered ends adapted to be received in the open ends of the workpiece lying in said runners, means for moving the seals to and from the open ends of said workpiece, means actuated by the relatively movable mold members when the same move into closed position for operating the seal moving means in a direction to actuate said seals into said workpiece ends, valve means for connecting one of said seals to a liquid supply, check valve means for connecting the other seal to discharge, means for opening said valve means, means for applying a force to liquid admitted through said one seal to displace the same through the workpiece to fill the same and scavenge air therefrom, means for closing said valve means and check valve means, means for supplying increasing volumes of liquid into said workpiece to bulge the portion thereof lying within the cavity of the mold, and means responsive to a predetermined pressure in the liquid in the workpiece for interrupting the supply of bulging liquid.

10. Apparatus according to claim 9, characterized by the fact that means supplying liquid to one of said seal-actuating means at a pressure sufficient to force a portion of the tubular blank into the die cavity, and that means are provided for controlling the rate at which said liquid is supplied to said seal-actuating means.

11. Apparatus according to claim 9 characterized by the fact that means are provided for causing the seal actuating means to withdraw said seals from the ends of said workpiece when the supply of bulging liquid is interrupted.

12. Apparatus according to claim 9 in which each seal actuating means comprises a cylinder having a reciprocating piston therein and a piston rod, and that one of said tubular seals is secured to one of said rods and the other tubular seal is secured to the other rod.

13. Apparatus according to claim 9 in which the seal actuating means for one of the tubular seals and the means for supplying volumes of bulging liquid to the workpiece, comprises a pair of cylinders arranged in tandem, one of said cylinders having a piston therein and a hollow piston rod the opposite ends of which project through the cylinder heads thereof, said hollow rod having one end connected to said tubular seal, and the other cylinder is provided with a reciprocating piston having a piston rod extending into the hollow of said hollow piston from the end opposite the one to which the tubular seal is connected, said latter piston when supplied with operating pressure applied in a direction to move its rod into the hollow rod, displacing liquid supplied thereto by said liquid supply, into the workpiece in the mold.

14. Apparatus according to claim 9, in which means are provided for admitting liquid pressure to one of said seal actuating means in response to a predetermined high value of bulging pressure being developed, for feeding a portion of said work lying in the runner into the mold cavity.

15. Apparatus according to claim 9, in which means are provided for admitting liquid pressure to one of said seal actuating means in response to a predetermined high value of bulging pressure being developed, for feeding a portion of said work lying in the runner into the mold cavity, and means responsive to a predetermined value of pressure being developed in said bulging means for interrupting the feed stroke thereof and reversing said seal actuating means to retracted position.

16. Apparatus according to claim 9, in which means are provided for admitting liquid pressure to one of said seal actuating means in response to a predetermined high value of bulging pressure being developed, for feeding a portion of said work lying in the runner into the mold cavity, means responsive to a predetermined value of pressure being developed in said seal actuating means for interrupting the feed stroke thereof and reversing said seal actuating means to retracted position, and means responsive to the release of fluid pressure in said workpiece for disconnecting the clamping cylinder from its source of pressure and reversing the mold positioning cylinder to open mold position.

17. Apparatus for bulging a tubular blank to the shape of a cavity in a split mold having relatively movable mold members, comprising an hydraulic power cylinder mechanism for opening and closing the mold members, said split mold having runners providing access to the open ends of a hollow workpiece in the mold, hollow tubular seals having tapered ends positioned to be moved into the runners of said mold when closed and into the ends of a hollow blank therein, an hydraulic cylinder for actuating each of said seals, each cylinder having a piston and a ram coupled to its respective seal, one of said rams being hollow, means for supplying liquid into one of said rams for filling said ram and hollow blank, the other ram having means for effecting the flow of liquid through said hollow ram and hollow blank to scavenge air therefrom and to fill the hollow blank with liquid, an hydraulic bulging cylinder having a piston therein and a bulging ram coupled thereto, said bulging ram working in said hollow ram and being disposed to displace liquid into the hollow blank in the mold, one of said hydraulic seal actuating cylinders being provided with means for causing the same to force a predetermined length of an end portion of the hollow blank in said runner into the mold cavity.

References Cited in the file of this patent

UNITED STATES PATENTS

| | | |
|---|---|---|
| 476,058 | Moorfield | May 31, 1892 |
| 1,007,792 | Orton | Nov. 7, 1911 |
| 2,203,868 | Grey et al. | June 11, 1940 |
| 2,302,132 | MacMillen et al. | Nov. 17, 1942 |
| 2,331,430 | Shoemaker | Oct. 12, 1943 |
| 2,344,743 | Smith | Mar. 21, 1944 |
| 2,380,153 | Davis | July 10, 1945 |
| 2,407,855 | Stephens | Sept. 17, 1946 |
| 2,410,694 | Tyler | Nov. 5, 1946 |
| 2,434,375 | Van Suan | Jan. 13, 1948 |

FOREIGN PATENTS

| | | |
|---|---|---|
| 6,540 | Great Britain | Mar. 12, 1897 |